US007803846B2

(12) United States Patent
Yoshida et al.

(10) Patent No.: US 7,803,846 B2
(45) Date of Patent: Sep. 28, 2010

(54) HIGHLY DURABLE POLYMER ELECTROLYTIC MEMBRANE FOR A FUEL CELL HAVING A CROSS-LINKED STRUCTURE

(75) Inventors: Masaru Yoshida, Takasaki (JP); Masaharu Asano, Takasaki (JP); Tetsuya Yamaki, Takasaki (JP); Soji Nishiyama, Ibaraki (JP); Toshimitsu Tachibana, Ibaraski (JP); Yozo Nagai, Ibaraki (JP)

(73) Assignees: Japan Atomic Energy Agency, Ibaraki (JP); Nitto Denko Corporation, Ibaraki (JP)

( * ) Notice: Subject to any disclaimer, the term of this patent is extended or adjusted under 35 U.S.C. 154(b) by 1326 days.

(21) Appl. No.: 11/214,045

(22) Filed: Aug. 30, 2005

(65) Prior Publication Data
US 2006/0134493 A1 Jun. 22, 2006

(30) Foreign Application Priority Data
Dec. 22, 2004 (JP) .............................. 2004-371249

(51) Int. Cl.
*C08J 5/20* (2006.01)
(52) U.S. Cl. .............................. 521/27; 521/28; 521/32; 521/33; 526/243; 204/282
(58) Field of Classification Search .................. 521/27, 521/28, 32, 33; 526/243; 204/282
See application file for complete search history.

(56) References Cited

U.S. PATENT DOCUMENTS 3,970,534 A * 7/1976 Fujiwara et al. ................ 521/32
5,656,386 A * 8/1997 Scherer et al. ................. 429/23
6,607,856 B2 * 8/2003 Suzuki et al. .................. 429/30

FOREIGN PATENT DOCUMENTS

| JP | 8-503574 | | 4/1996 |
|---|---|---|---|
| JP | 08-503754 | * | 4/1996 |
| JP | 2003-082129 | | 3/2003 |
| JP | 2003-261697 | | 9/2003 |
| JP | 2004-014436 | | 1/2004 |
| JP | 2004-051685 | | 2/2004 |
| JP | 2004-059752 | | 2/2004 |
| JP | 2004-158270 | | 6/2004 |
| JP | 2004-300360 | | 10/2004 |
| JP | 2005-063778 | | 3/2005 |
| JP | 2005-142014 | | 6/2005 |

OTHER PUBLICATIONS

Japanese Office Action issued Feb. 17, 2010 in corresponding Japanese Patent Application 2004-371249.

* cited by examiner

*Primary Examiner*—Peter D. Mulcahy
*Assistant Examiner*—Henry Hu

(57) ABSTRACT

The objective of the invention is to solve the problems of conventional polymer electrolyte membranes, including small ion-exchange capacity and low oxidation and methanol resistance. A polymer film substrate is irradiated with γ-rays, electron beams or other radiations to perform multi-graft polymerization with functional monomers and then the polymer film substrate containing the grafted molecular chains or the graft molecular chains into which sulfonic acid groups have been introduced is crosslinked by irradiation to produce a polymer electrolyte membrane that has outstanding oxidation resistance, dimensional stability, electrical conductivity and methanol resistance and which can be controlled in ion-exchange capacity over a wide range.

4 Claims, No Drawings

HIGHLY DURABLE POLYMER ELECTROLYTIC MEMBRANE FOR A FUEL CELL HAVING A CROSS-LINKED STRUCTURE

BACKGROUND OF THE INVENTION

This invention relates to a polymer electrolyte membrane suitable for use in fuel cells. The invention also relates to a polymer electrolyte membrane suitable for use in fuel cells that has not only outstanding oxidation resistance, heat resistance and dimensional stability but also outstanding electrical conductivity.

Fuel cells using polymer electrolyte membranes feature high energy density, so using methanol, hydrogen and the like for fuel, they hold promise for use as power supplies or convenient auxiliary power supplies to mobile communication devices, household cogeneration systems and automobiles. One of the most critical aspects of the fuel cell technology is the development of polymer electrolyte membranes having outstanding characteristics.

In a polymer electrolyte fuel cell, the electrolyte membrane serves to conduct protons and it also plays the part of diaphragm which prevents direct mixing of the fuel hydrogen or methanol with the oxidant air (oxygen). The electrolyte membrane has several requirements to meet: large ion-exchange capacity; sufficient chemical stability of the membrane to allow for prolonged application of an electric current, in particular, high resistance (oxidation resistance) to hydroxide radicals and the like which are principal factors that contribute to deterioration of the membrane; heat resistance at 80° C. which is the cell operating temperature and above; and constant and high water retention of the membrane which enables it to keep low electrical resistance. In addition, the electrolyte membrane which also plays the part of diaphragm is required to have outstanding mechanical strength and dimensional stability, as well as having no excessive permeability to hydrogen gas, methanol or oxygen gas.

Early models of the polymer electrolyte fuel cell used a hydrocarbon-based polymer electrolyte membrane produced by copolymerization of styrene and divinylbenzene. However, this electrolyte membrane, being very poor in durability due to low oxidation resistance, was not highly feasible and later extensively replaced by perfluorosulfonic acid-based membranes such as DuPont's Nafion®.

The conventional fluorine-containing polymer electrolyte membranes such as Nafion® have outstanding chemical durability and stability but, on the other hand, their ion-exchange capacity is very small (ca. 1 meq/g) and, due to insufficient water retention, the ion-exchange membrane will dry up, thereby impedes proton conduction or, in the case of using methanol for fuel, causes swelling of the membrane or cross-over of the methanol.

If, in order to increase the ion-exchange capacity, one attempts to introduce more sulfonic acid groups, the membrane which has no cross-linked structure in polymer chains will swell and its strength drops markedly, whereby it will break easily. Therefore, with the conventional fluorine-containing polymer electrode membranes, the quantity of sulfonic acid groups had to be adjusted to small enough levels to guarantee the required membrane strength, so that one could only produce membranes having ion-exchange capacities of no more than about 1 meq/g.

In addition, the fluorine-containing polymer electrolyte membranes such as Nafion® have the problem of difficult and complex monomer synthesis; what is more, the step of polymerizing the synthesized monomers to produce the intended polymer membrane is also complex and yields a very expensive product, thereby presents a large obstacle to realizing a commercial proton-exchange membrane fuel cell that can be installed on automobiles and other equipment. Hence, efforts have been made to develop low-cost and high-performance electrolyte membranes that can be substituted for Nafion® and other conventional fluorine-containing polymer electrolyte membranes.

In the field of radiation-induced graft polymerization which is closely related to the present invention, attempts are being made to prepare solid polymer electrolyte membranes by grafting onto polymer membranes those monomers into which sulfonic acid groups can be introduced. The present inventors conducted intensive studies with a view to developing such new solid polymer electrolyte membranes and found that solid polymer electrolyte membranes characterized by a wide range of controllability of ion-exchange capacity could be produced by first introducing a styrene monomer into a poly(tetrafluoroethylene) film having a cross-linked structure by radiation-induced graft reaction and then sulfonating the grafts. The solid polymer electrolyte membrane having such characteristics and the process for producing it were applied for patent (JP 2001-348439 A). However, the styrene graft chains in this polymer electrolyte membrane were composed of hydrocarbons, so when an electric current was passed through the membrane for a prolonged period of time, the graft chains were partly oxidized to lower the ion-exchange capacity of the membrane.

The present inventors also found that solid polymer electrolyte membranes characterized by a wide range of ion-exchange capacity and outstanding oxidation resistance could be produced by first performing radiation-induced grafting or co-grafting of a fluorine-containing monomer on a poly(tetrafluoroethylene) film having a cross-linked structure and then introducing sulfone groups into the graft chains. The solid polymer electrolyte membrane having such characteristics and the process for producing it were applied for patent (JP 2002-348389 A). However, as it turned out, the ordinary fluorine-containing polymer membranes had the problem that the graft reaction of the fluorine-containing monomer was difficult to get deep into the membrane and that depending on the reaction conditions, the graft reaction was restricted to the film surface, thus making it difficult to improve the characteristics of the film as an electrolyte membrane.

The present invention was accomplished in order to solve the aforementioned problems of the prior art and has as an object providing a solid polymer electrolyte that is free from the defects of the conventional polymer ion-exchange membranes, namely, small ion-exchange capacity, low dimensional stability of the membrane and, in particular, low oxidation resistance which is the most critical disadvantage.

SUMMARY OF THE INVENTION

The present invention provides a polymer electrolyte membrane having a broad range of ion-exchange capacity and outstanding oxidation resistance and electrical conductivity that make the membrane suitable for use on fuel cells.

The present inventors made continued studies on a process which comprised performing multi-graft copolymerization in which a polymer film was irradiated so that a variety of monomers would be simultaneously grafted to the film and then introducing sulfonic acid groups into the graft chains formed. As a result, they came up with a process for producing a polymer electrolyte membrane characterized by performing multi-grafting of a monofunctional monomer and a polyfunctional monomer to a substrate polymer film under exposure to an ionizing radiation, with care being taken to ensure that grafting will proceed toward the center of the membrane, thereafter cross-linking the polymer film substrate containing the introduced graft chains under exposure to radiation, and finally introducing sulfonic acid groups. As regards the timing of irradiation, it is also within the scope of the present invention to produce a polymer electrolyte membrane by first grafting monomers to the substrate, then introducing sulfonic acid groups into the graft chains formed, and thereafter irradiating the substrate polymer film to impart a cross-linked structure. The polymer electrolyte membrane of the present invention is characterized in that it has the monomers grafted to the polymer film by a degree of 6-120% (degree of grafting at 6-120%) and that it has an ion-exchange capacity of 0.3-4.0 meq/g. The polymer electrolyte membrane of the present invention is also characterized in that its various characteristics such as ion-exchange capacity can be controlled over an appropriate wide range, that it has high electrical conductivity, that it has high dimensional stability as a membrane, and that it particularly has very superior oxidation resistance since it has a cross-linked structure imparted to a polymer film substrate containing graft chains or those graft chains into which sulfonic acid groups have been introduced.

The polymer electrolyte membrane produced by the process of the present invention is characterized in that it has outstanding oxidation resistance, electrical conductivity, dimensional stability and methanol resistance, as well as a wide range over which its ion-exchange capacity can be controlled.

The ion-exchange membrane of the present invention which has the characteristics mentioned above is particularly suitable for use in fuel cells. It is also useful as an inexpensive and durable electrolyte membrane or ion-exchange membrane.

DETAILED DESCRIPTION OF THE INVENTION

In one embodiment of the invention, a highly heat-resistant and oxidation-resistant poly(vinylidene fluoride) (hereunder abbreviated as PVDF) is used as the polymer film substrate.

In the present invention, monomers to be grafted to the polymer film substrate are combinations of monofunctional vinyl monomers of group A and polyfunctional vinyl monomers of group B, which may be further combined with sulfonyl vinyl monomers of group C, as listed below:

(1) Group A monomers selected from the group consisting of styrene; aykylstyrenes such as methylstyrenes (e.g., α-methylstyrene and vinyltoluene), ethylstyrenes, dimethylstyrenes, trimethylstyrenes, pentamethylstyrenes, diethylstyrenes, isopropylstyrenes, and butylstyrenes (e.g., 3-tert-butylstyrene and 4-tert-butylstyrene); halogenated styrenes such as chlorostyrenes, dichlorostyrenes, trichlorostyrenes, bromostyrenes (e.g., 2-bromostyrene, 3-bromostyrene and 4-bromostyrene), and fluorostyrenes (e.g., 2-fluorostyrene, 3-fluorostyrene and 4-fluorostyrene); alkoxystyrenes such as methoxystyrenes, methoxymethylstyrenes, dimethoxystyrenes, ethoxystyrenes, and vinylphenyl allyl ethers; hydroxystyrene derivatives such as hydroxystyrenes, methoxyhydroxystyrenes, acetoxystyrenes, and vinylbenzyl alkyl ethers; vinylbenzoic acids; carboxystyrene derivatives such as formylstyrenes; nitrostyrene derivatives such as nitrostyrenes; aminostyrene derivatives such as aminostyrenes and dimethlaminostyrenes; vinyl benzylsulfonic acids; and ion-containing styrene derivatives such as styrene sulfonyl fluorides;

(2) Group B crosslinking agents selected from the group consisting of bis(vinylphenyl)ethane, divinylbenzene, 2,4,6-triallyloxy-1,3,5-triazine(triallylcyanurate), triallyl-1,2,4-benzenetricarboxylate (triallyltrimellitate), diallyl ether, triallyl-1,3,5-triazine-2,4,6-(1H,3H,5H)-trione, 2,3-diphenylbutadiene, 1,4-diphenyl-1,3-butadiene, 1,4-divinyloctafluorobutane, bis(vinylphenyl)methane, divinylacetylene, divinyl sulfide, divinyl sulfone, divinyl ether, divinyl sulfoxide, isoprene, 1,5-hexadiene, butadiene, and 1,4-divinyl-2,3,5,6-tetrachlorobenzene.

(3) Group C sulfonyl vinyl monomers selected from the group consisting of $CF_2=CF(SO_2X^1)$ (where $X^1$ is a halogen group which is —F or —Cl), $CH_2=CF(SO_2X^1)$ (where $X^1$ is a halogen group which is —F or —Cl), $CF_2=CF(O(CF_2)_{1-4}SO_2X^1)$ (where $X^1$ is a halogen group which is —F or —Cl), $CF_2=CF(OCH_2(CF_2)_{1-4}SO_2X^1)$ (where $X^1$ is a halogen group which is —F or —Cl), $CF_2=CF(SO_2R^1)$ (where $R^1$ is an alkyl group which is —$CH_3$, —$C_2H_5$, or —$C(CH_3)_3$), $CH_2=CF(SO_2R^1)$ (where $R^1$ is an alkyl group which is —$CH_3$, —$C_2H_5$, or —$C(CH_3)_3$), and $CF_2=CF(OCH_2(CF_2)_{1-4}SO_2R^1)$ (where $R^1$ is an alkyl group which is —$CH_3$, —$C_2H_5$, or —$C(CH_3)_3$).

The monomers of groups (1)-(3) may be used as dilutions with various solvents such as Freon® 112 ($CCl_2FCCl_2F$), Freon® 113 ($CCl_2FCCF$), dichloroethane, chloromethane, n-hexane, alcohol, t-butanol, benzene, toluene, cyclohexane, cyclohexanone, and dimethyl sulfoxide.

To graft the above-mentioned monomers to the polymer film substrate, the latter is first put into a stainless or glass pressure-resistant vessel, which is sufficiently drawn to a vacuum and then charged with the monomers after they have been deprived of oxygen gas by bubbling with an inert gas or by freeze-degassing, and γ-rays from $^{60}Co$ are applied to a total dose of 5-500 kGy in an inert gas at room temperature. Graft polymerization can be performed by either "simultaneous irradiation" in which the polymer film substrate and the monomers are simultaneously irradiated to effect graft reaction or by "post-graft polymerization" in which the polymer film substrate is first irradiated before it is brought into contact with the monomers to effect graft reaction. Graft polymerization is effected at room temperature if simultaneous irradiation is adopted; if post-graft polymerization is adopted, the temperature is not higher than the boiling points of the monomers or the solvent and is typically between 0° C. and 150° C. The presence of oxygen retards the grafting reaction, so the sequence of operations described above are performed in an inert gas such as argon gas or nitrogen gas and the monomers or the solution having them dissolved in a solvent is used after they have been deprived of oxygen by a common method of treatment (bubbling or freeze-degassing).

The present invention is characterized by using a graft polymerization technique that allows a plurality of monomers to be grafted simultaneously and this technique is defined as "multi-graft polymerization".

In simultaneous irradiation, the degree of grafting (see formula (1) in the Examples) is higher at increasing dose of radiation, or as the lower dose rate of radiation is applied for a longer period. In post-graft polymerization, the degree of grafting is higher at increasing dose, or at higher graft temperature, or as the grafting time is extended.

The ionizing radiation to be used is preferably γ-rays or X-rays having high penetrating power or electron beams having sufficiently high energy to penetrate the irradiation vessel, the film substrate or the monomer solution.

The polymer film substrate may be formed of poly(vinylidene fluoride)(PVDF) as in one embodiment of the present invention; other substrates that can be used include high-molecular weight polyethylene, polypropylene, polystyrene, polyamide, aromatic polyamide, polyethylene terephthalate, polyethylene naphthalate, polycarbonate, polyether ketone, polyether ether ketone, polyether sulfone, polyphenylene sulfide, and polysulfone film substrates. Polyimide-based polymer films such as polyimide, polyether imide, polyamide imide, polybenzimidazole, and polyether ether imide film substrates can also be used. Other examples that can be used are film substrates that are made of fluorine-containing polymers such as ethylene-tetrafluoroethylene copolymers, polytetrafluoroethylene, tetrafluoroethylene-hexafluoropropylene copolymers, and tetrafluoroethylene-perfluoroalkylvinyl ether copolymers.

The present inventors had already shown that when preliminarily crosslinked film substrates were used as the above-mentioned polymer film substrates, several advantages were obtained, including an improvement in the heat resistance of the ion-exchange membranes obtained, a smaller degree of membrane swelling, a higher degree of subsequent grafting of monomers onto the crosslinked structure, and prevention of a drop in membrane strength that would otherwise occur upon irradiation. Taking advantage of these features, the present inventors grafted styrene to crosslinked polytetrafluoroethylene and found that compared to uncrosslinked polytetrafluoroethylene, the degree of grafting could be increased markedly and 2 to 10 times as many sulfonic acid groups could be introduced into the crosslinked polyetetrafluoroethylene as into the uncrosslinked polytetrafluoroethylene (JP 2001-348439 A, or Japanese Patent Application 2000-170450). Methods for producing crosslinked tetrafluoroethyelene-hexafluoropropylene copolymers and tetrafluoroethylene-perfluoroalkylvinyl ether copolymers are described in Radiation Physics and Chemistry, 42, 139-142 (1993).

In order to introduce sulfonic acid groups into the polymeric film substrates to which monomers have been grafted, the molecular chains of (1)-(3) that have been grafted or the phenyl groups in the grafted molecular chains may be reacted with a solution of chlorosulfonic acid in dichloroethane or chloroform, whereupon the sulfonic acid groups can be introduced into the graft chains. In the case of hydrocarbon-based polymer film substrates having aromatic rings, the introduction of sulfonic acid groups by means of chlorosulfonic acid may cause sulfonation of the substrate itself depending on the conditions. On the other hand, [—$SO_2X^1$] groups in the grafted molecular chains are converted to sulfonate [—$SO_3M$] groups (where M is an alkali metal which is Na or K) by reaction in a 0.1M-10M solution of potassium hydroxide (KOH) or sodium hydroxide (NaOH) in water, a mixture of water and alcohol, or a mixture of water and dimethyl sulfoxide at a temperature between room temperature and 100° C.; thereafter, the sulfonate groups are converted to sulfonic acid groups [—$SO_3H$] in a 1M-2M sulfuric acid solution at 60° C., whereby the desired polymer ion-exchange membrane is obtained. Alternatively, the [—$SO_3R^1$] groups in the grafted molecular chains are subjected to hydrolysis by reaction in an acidic solution such as a 0.1M-10M sulfuric acid solution at between room temperature and 100° C. or hydrolyzed in a potassium or sodium hydroxide solution at the same concentration, whereby the [—$SO_3R^1$] groups are converted to sulfonic acid groups [—$SO_3H$] to yield the desired polymer ion-exchange membrane. On the other hand, the halogen groups [—$X^2$] in the grafted molecular chains are subject to react in a solution of sulfite or hydrogensulfite in water, a mixture of water and alcohol, or the like so that they are converted to sulfonate groups [—$SO_3M$] (where M is an alkali metal which is Na or K) and subsequently the sulfonate groups are converted to sulfonic acid groups [—$SO_3H$] by the same method as described above.

The method of imparting a crosslinked structure by means of electron beams or γ-rays is characterized in that the radiation is applied to the polymer film substrate containing the grafted molecular chains or those into which sulfonic acid groups have been introduced. In this way, not only the polymer film substrate but also the grafted molecular chains or those into which sulfonic acid groups have been introduced can be crosslinked simultaneously, whereupon one can produce a polymer electrolyte for use in fuel cells that is more durable and has greater oxidation resistance.

The polymer electrolyte membrane according to the present invention has the advantage that the ion-exchange capacity of the membrane obtained can be varied by controlling the amount of grafts and the degree of sulfonating reaction, namely, the amount of the sulfonic acid groups to be introduced. The graft reaction shows a tendency to saturate gradually when the degree of grafting reaches 60-80%. In the present invention, the degree of grafting is preferably 10-150%, more preferably 10-100%, with respect to the polymer film substrate.

The term "ion-exchange capacity" as used herein is calculated for one gram of the weight of a dry electrolyte membrane and is expressed in meq/g (i.e., a molar amount of ion-exchange groups per mass of polymer). Depending on the type of the graft monomer used, the ion-exchange capacity is smaller than 0.3 meq/g if the degree of grafting is less than 10%, and the swelling of the membrane increases if the degree of grafting is more than 150%. In other words, the ion-exchange capacity increases as the graft ratio is increased to introduce a greater amount of ion-exchange groups. However, if an excessive amount of ion-exchange groups are introduced, the membrane will swell upon absorbing water and its strength drops. Hence, the polymer ion-exchange membrane of the present invention preferably has an ion-exchange capacity of 0.3 meq/g to 4.0 meq/g, more preferably 0.5 meq/g to 2.5 meq/g.

In the polymer electrolyte membrane of the present invention, its water content can be controlled by selecting a suitable grafting substrate or adjusting the amount of sulfonic acid groups to be introduced or the molecular structures of the graft monomers. If the membrane is to be used as an electrolyte membrane for fuel cells, an unduly low water content is not preferred since the slightest change in the operating conditions will cause a variation in electrical conductivity or gas permeation coefficient. The conventional Nafion® membrane has almost all molecular chains composed of [—$CF_2$—] and it has no crosslinked structure, so if the cell is operated at a temperature higher than 80° C., the membrane will absorb water excessively and swells to experience a rapid decrease in conductivity.

By contrast, in the case of the polymer electrolyte membrane of the present invention, a crosslinked structure can be introduced simultaneously into the polymer film substrate and the grafted molecular chains or those to which sulfonic acid groups have been introduced; therefore, depending mainly on the amount of sulfonic acid groups introduced, the water content can be controlled within the range of 10-120 wt %. In general, the water content increases with increasing ion-exchange capacity and in the case of the polymer electrolyte membrane of the present invention, its water content can be adjusted between 10 and 120 wt %, preferably between 20 and 80 wt %.

The higher the electrical conductivity of the polymer electrolyte membrane which is related to its ion-exchange capacity, the smaller its electrical resistance and the higher its performance as an electrolyte membrane. If the electrical conductivity of the ion-exchange membrane at 25° C. is less than 0.05 ($[\Omega \cdot cm]^{-1}$), the power performance as a fuel cell often drops significantly and, hence, the electrical conductivity of the polymer electrolyte membrane is often designed to be at least 0.05 ($[\Omega \cdot cm]^{-1}$), and at least 0.10 ($[\Omega \cdot cm]^{-1}$) in the case of a polymer electrolyte membrane with higher performance. The polymer electrolyte membrane of the present invention showed an electrical conductivity at 25° C. that was at least comparable to that of the Nafion® membrane. This is probably due to the crosslinking of both the polymer film substrate and the graft molecular chains into which sulfonic acid groups had been introduced; swelling of the membrane by water was accordingly prevented and as a result, the interaction between adjacent sulfonic acid groups was sufficiently facilitated to enhance the transfer of ions to a comparatively high level.

In order to enhance the electrical conductivity of the polymer electrolyte membrane, one may try to reduce its thickness. However, given the current technology, an unduly thin polymer electrolyte membrane is easy to break and difficult to manufacture. Therefore, polymer electrolyte membranes in common use are 30-200 μm thick. In the case of the present invention, an effective membrane thickness is between 10 and 200 μm, preferably between 20 and 150 μm.

Methanol is currently considered to be a candidate fuel for use in fuel cells but the perfluorosulfonic acid based Nafion® membrane, having no crosslinked structure between molecular chains, swells greatly in the presence of methanol and the "cross-over" of the fuel, or the diffusion of the fuel methanol from the anode (fuel electrode) to the cathode (air electrode) through the cell membrane, has been a big problem that is said to lower the efficiency of power generation. However, in the polymer electrolyte membrane of the present invention, the graft molecular chains into which sulfonic acid groups have been introduced are mutually crosslinked with the polymer film substrate to form a structure that sufficiently resists swelling that the membrane will swell almost negligibly in the presence of alcohols including methanol. Hence, the polymer electrolyte membrane of the present invention is useful as a membrane in a direct-methanol fuel cell which does not use a reformer but is fueled direct from methanol.

In fuel cell membranes, the membrane oxidation resistance is an extremely important characteristic that is associated with the membrane durability (service life). During the cell operation, OH radicals and the like attack the ion-exchange membrane to cause its deterioration. A polymer electrolyte membrane produced by first grafting hydrocarbon-containing styrene to a polymer film and then sulfonating the polystyrene graft chains has an extremely low oxidation resistance. Take, for example, a polymer film substrate having a crosslinked structure imparted thereto before introducing graft molecular chains; when polystyrene chains grafted to a degree of 45% were sulfonated, there was obtained a crosslinked electrolyte membrane with polystyrene grafts but this ion-exchange membrane deteriorated in a 3% aqueous $H_2O_2$ solution in about 20 hours at 60° C., causing elimination of the electroconductive styrene sulfonic acid groups (Comparative Example 3). This is because the polystyrene chains are easily degraded by the attack of OH radicals.

By contrast, the polymer electrolyte membrane according to the present invention is characterized not only in that the graft molecular chains per se to which sulfonic acid groups have been introduced are highly crosslinked by means of a chemical cross-inker but also in that such graft molecular chains and the polymer film substrate are mutually crosslinked by irradiation; as a result, the polymer electrolyte membrane of the present invention has extremely high oxidation resistance and its ion-exchange capacity will hardly change even if it is placed in a 3% aqueous $H_2O_2$ solution at 60° C. for longer than 400 hours.

As described on the foregoing pages, the polymer electrolyte membrane of the present invention has not only superior oxidation resistance, dimensional stability and methanol resistance; at the same time, it also has the advantage that the ion-exchange capacity which is an important characteristic for membranes can be controlled over a wide range between 0.3 and 4.0 meq/g.

EXAMPLE

On the following pages, the present invention is described with reference to examples and comparative examples, to which the present invention is by no means limited. The various parameters referred to in those examples and comparative examples were measured by the following methods.

(1) Degree of Grafting (%)

If the film substrate is taken as the main chain portion and the grafted portion of a fluorine-containing monomer or a mixture thereof with a hydrocarbon-containing monomer is taken as the graft chain portion, the weight ratio of the graft chain portion to the main chain portion is expressed as the degree of grafting ($X_{dg}$ [wt %]) by the following equation:

$$X_{dg}=100(W_2-W_1)/W_1$$

$W_1$: the weight (g) in a dry state before grafting
$W_2$: the weight (g) in a dry state after grafting (2) Ion-exchange Capacity (meq/g)

The ion-exchange capacity (IEC) of a membrane is expressed by the following equation:

$$IEC=[n(\text{acid group})_{obs}]/W_d$$

[n(acid group)$_{obs}$]: the amount of acid groups (mM) in the ion-exchange membrane
$W_d$: the dry weight (g) of the ion-exchange membrane In order to ensure accuracy in the measurement of [n(acid group)$_{obs}$], the membrane was immersed again in 1M sulfuric acid solution at 50° C. for 4 hours until it was completely converted to an acid form (H-form). Thereafter, the membrane was immersed in a 3M aqueous NaCl solution at 50° C. for 4 hours until it was converted to a —SO$_3$Na form; the replaced protons (H$^+$) were subjected to neutral titration with 0.2M NaOH to determine the concentration of acid groups.

(3) Water content (%)

A H-form ion-exchange membrane stored in water at room temperature was taken out of water, wiped lightly, and left to stand for a while (about 1 minute); the membrane's weight was found to be $W_s$ (g); thereafter, the membrane was vacuum-dried at 60° C. for 16 hours to measure its dry weight $W_d$ (g); the water content of the membrane can be determined from $W_s$ and $W_d$ by the following equation:

$$\text{Water content}=100(W_s-W_d)/W_d$$

(4) Proton Conductivity ($\Omega^{-1}$ cm$^{-1}$)

The proton conductivity of the polymer electrolyte membrane was measured by the AC method [Shin-Jikken Kagaku Koza (New Course in Experimental Chemistry) 19, Kobunshi Kagaku (Polymer Science) <II>, p. 992, Maruzen] using a conventional membrane resistance measuring cell and an LCR meter E-4925A of Hewlett-Packard so as to measure the membrane resistance ($R_m$). The cell was filled with a 1M aqueous sulfuric acid solution and the resistance between platinum electrodes (5 mm apart) was measured both in the presence and absence of the membrane. The proton conductivity (specific conductance) of the membrane was calculated by the following equation:

$$\kappa = 1/Rm \cdot d/S$$

$\kappa$ = electrical conductivity ($\Omega^{-1}$ cm$^{-1}$) of the membrane
d: the thickness (cm) of the electrolyte membrane
S: the area (cm$^2$) of the electrolyte membrane through which an electric current was applied.

For comparison between measurements of electrical conductivity, the DC method was performed using a cell similar to that described by Mark W. Verbrugge, Robert F. Hill et al. (J. Electrochem. Soc., 137 (1990) 3770-3777) in combination with a potentiostat and a function generator. Good correlation was observed between the measurements of the AC and DC methods. The values in the following Table 1 were measurements by the AC method.

(5) Oxidation Resistance (Conductive Group Elimination Time)

The electrolyte membrane was swollen to saturation in an aqueous solution at 60° C. and the weight of the swollen membrane was used as a reference; the membrane was then immersed in a 3% $H_2O_2$ solution at 60° C. and the time lapsed until the weight of the electrolyte membrane began to decrease (the conductive group elimination time) was used as an index of oxidation resistance.

(6) Linear Swelling (%) of the Membrane

A sulfonic acid-form membrane was wetted in water at room temperature and was measured to have a length of $L_0$ on one side; the membrane was then immersed in a methanol solution under specified conditions and was measured to have a length of $L_M$ on the same side as wetted in the methanol solution at room temperature. The linear swelling (%) of the membrane was calculated by $100(L_M/L_0)$.

Example 1

A poly(vinylidene fluoride)(hereunder abbreviated as PVDF) substrate was cut to a size of 2 cm×2 cm and put into a separable glass container (3 cm i.d.×15 cm high) equipped with a cock; after degassing, the interior of the glass container was purged with argon gas. Under this condition, the PVDF film was irradiated with γ-rays from $^{60}$Co source at room temperature to a total dose of 30 kGy (at a dose rate of 10 kGy/h). Subsequently, the glass container was charged with 10 ml of a 40 wt% monomer [vinyl toluene/t-butylstyrene/bis(vinylphenyl)ethane] solution that had been preliminarily degassed and diluted with 60 vol% toluene and the film was immersed in the monomer solution. After purging with argon gas, the glass container was closed tightly and with the temperature adjusted at 50° C., graft polymerization was carried out for 5 hours. The resulting membrane was washed with toluene and dried. The degree of grafting was 35%.

The membrane after graft polymerization was transferred into a separable glass container equipped with a cock and after degassing, the interior of the glass container was purged with argon gas. Under this condition, a crosslinked structure was imparted to the membrane by irradiation with γ-rays at a temperature of 60° C. to a total dose of 100 kGy (at a dose rate of 10 kGy/h).

For sulfonation, the crosslinked, graft-polymerized membrane was immersed in 0.2M chlorosulfonic acid diluted with 1,2-dichloroethane, and following reaction at 80° C. for 6 hours, the membrane was washed with water to effect hydrolysis. The polymer electrolyte membrane thus produced in Example 1 was subjected to the measurements of ion-exchange capacity, water content, electrical conductivity, oxidation resistance, and linear swelling. The results are shown in Table 1 below.

TABLE 1

Characteristics of Polymer Electrolyte Membrane

|  | Graft ratio (%) | IEC (meq/g) | Conductivity ([Ω·cm]$^{-1}$) | Water content (%) | Oxidation resistance (hr) | Linear swelling (%) |
|---|---|---|---|---|---|---|
| Example 1 | 35 | 1.0 | 0.07 | 20 | 460 | 93 |
| Example 2 | 37 | 1.2 | 0.09 | 18 | 520 | 93 |
| Example 3 | 37 | 1.2 | 0.09 | 23 | 280 | 100 |
| Example 4 | 60 | 2.3 | 0.15 | 27 | 690 | 95 |
| Example 5 | 50 | 0.7 | 0.04 | 14 | 720* | 110 |
| Comparative Example 1 Nafion 112 | — | 0.9 | 0.06 | 30 | 720* | 140 |
| Comparative Example 2 | 45 | 2.0 | 0.13 | 27 | 24 | 94 |
| Comparative Example 3 | 40 | 1.3 | 0.10 | 27 | 360 | 93 |

*No elimination of conductive groups occurred throughout the test period of 720 hours.

Example 2

Graft polymerization was performed under the same conditions as in Example 1, except that divinylbenzene was added as a fourth monomer to the vinyltoluene/t-butylstyrene/bis(vinylphenyl)ethane monomer mixture. The degree of grafting was 37%. After the graft polymerization, the membrane was crosslinked by irradiation with γ-rays and sulfonated as in Example 1. The results are shown in Table 1.

Example 3

A PVDF film substrate was cut to a size of 2 cm×2 cm and put into a separable glass container (3 cm i.d.×15 cm high) equipped with a cock; after degassing, the interior of the glass container was purged with argon gas. Under this condition, the PVDF film was irradiated with γ-rays from a $^{60}$Co source at room temperature to a total dose of 30 kGy (at a dose rate of 10 kGy/h). Subsequently, the glass container was charged with 10 ml of a monomer [vinyl toluene/t-butylstyrene/bis(vinylphenyl)ethane/divinylbenzene] solution that had been preliminarily degassed and diluted with 60 vol% toluene and the film was immersed in the monomer solution. After purging with argon gas, the glass container was closed tightly and with the temperature adjusted at 50° C., graft polymerization was carried out for 5 hours. The resulting membrane was washed with toluene and dried. The degree of grafting was 35%. For sulfonation, the crosslinked, graft-polymerized membrane was immersed in 0.2M chlorosulfonic acid diluted with 1,2-dichloroethane, and following reaction at 80° C. for 6 hours, the membrane was washed with water to effect hydrolysis.

The electrolyte membrane into which sulfonic acid groups had been introduced was transferred into a separable glass container equipped with a cock and after degassing, the interior of the glass container was purged with argon gas. Under this condition, a crosslinked structure was imparted to the electrolyte membrane by irradiation with γ-rays at a temperature of 60° C. to a total dose of 100 kGy (at a dose rate of 10 kGy/h). The results are shown in Table 1.

Example 4

The procedure of Example 2 was repeated, except that the polymer film substrate was changed from PVDF to an ethylene-tetrafluoroethylene copolymer (hereunder abbreviated as ETFE). The degree of grafting was 60%. The EFFE substrate containing the grafted molecular chains was crosslinked by irradiation with γ-rays at a temperature of 60° C. to a total dose of 100 kGy (at a dose rate of 10 kGy/h). The results are shown in Table 1.

Example 5

An ETFE film substrate was cut to a size of 2 cm×2 cm and put into a separable glass container (3 cm i.d.×15 cm high) equipped with a cock; then, 10 ml of a monomer [1,2,2-trifluoroethylene sulfonyl chloride ($CF_2$=$CF$—$SO_2F$)/2-fluorostyrene/butadiene] solution was charged until the film was submerged in the monomer solution; by repeating freezing/degassing cycles, the monomer liquid and the ETFE film were deprived of air. Finally, the interior of the glass container was purged with argon gas and it was closed tightly. Under this condition, the ETFE film was irradiated with γ-rays at room temperature to a total dose of 100 kGy (at a dose rate of 10 kGy/h). After the irradiation, the temperature was adjusted to 60° C. and graft polymerization was carried out for 24 hours; the membrane was washed first with toluene, then with acetone, and the resulting film was dried. The degree of grafting was 50%.

The membrane after graft polymerization was transferred into a separable glass container equipped with a cock and after degassing, the interior of the glass container was purged with argon gas. Under this condition, a crosslinked structure was imparted to the membrane by irradiation with γ-rays at a temperature of 60° C. to a total dose of 100 kGy (at a dose rate of 10 kGy/h).

The crosslinked, graft-polymerized membrane was first subjected to reaction in a solution of 20 wt % KOH in a 1:2 mixture of dimethyl sulfoxide and water at 80° C. for 24 hours. After the reaction, the membrane was recovered, washed with water, treated in a 2M sulfuric acid solution at 60° C. for 4 hours, then immersed in 0.2M chlorosulfonic acid diluted with 1,2-dichloroethane, subjected to reaction at 60° C. for 6 hours, and washed with water to effect hydrolysis. The results are shown in Table 1.

The membranes prepared in Examples 1-5 showed almost no swelling in methanol as compared with the Nafion® membrane, so they will be extremely effective as membrane materials in direct-methanol fuel cells. Table 1 demonstrated the effectiveness of the present invention.

Comparative Example 1

Nafion® 112 (DuPont) was measured for its ion-exchange capacity, electrical conductivity, water content, oxidation resistance, and linear swelling and the results are shown in Table 1 for "Comparative Example 1."

Comparative Example 2

The procedure of Example 1 was repeated, except that a crosslinked structure was preliminarily imparted to a PVDF film substrate by irradiation at a temperature of 60° C. to a total dose of 100 kGy (at a dose rate of 10 kGy/h) in an argon gas atmosphere. Then, the crosslinked PVDF film was put into a separable glass container (3 cm i.d.×15 cm high) equipped with a cock and, after degassing, the container was purged with argon gas. Under this condition, the PVDF film was irradiated again with γ-rays at room temperature to a total dose of 30 kGy (at a dose rate of 10 kGy/h). Subsequently, a styrene monomer that had been bubbled with argon gas so that it was deprived of oxygen and purged with argon gas was introduced into the PVDF film containing glass container until the membrane was submerged in the monomer, and graft copolymerization was performed at a temperature of 60° C. for 6 hours. Thereafter, the graft copolymerized membrane was washed first with toluene, then with acetone, and dried. The degree of grafting was 45%. The graft polymerized membrane was immersed in 0.2M chlorosulfonic acid (with 1,2-dichloroethane used as solvent) and subjected to sulfonation reaction at 60° C. for 24 hours. Thereafter, the membrane was washed with water to leave sulfonic acid groups behind.

Comparative Example 3

The procedure of Example 4 was repeated, except that a crosslinked structure was preliminarily imparted to an ETFE film substrate by irradiation at a temperature of 60° C. to a total dose of 100 kGy (at a dose rate of 10 kGy/h) in an argon gas atmosphere. Then, the crosslinked ETFE film was put into a separable glass container (3 cm i.d.×15 cm high) equipped with a cock and, after degassing, the container was purged with argon gas. Under this condition, the ETFE film was irradiated again with γ-rays at room temperature to a total dose of 30 kGy (at a dose rate of 10 kGy/h). Subsequently, monomers (four in number) that had been bubbled with argon gas so that they were deprived of oxygen and purged with argon gas were introduced into the ETFE film containing glass container until the membrane was submerged in the monomer mixture, and graft copolymerization was performed at a temperature of 50° C. for 6 hours. Thereafter, the graft copolymerized membrane was washed first with toluene, then with acetone, and dried. The degree of grafting was 40%. The graft polymerized membrane was immersed in 0.2M chlorosulfonic acid (with 1,2-dichloroethane used as solvent) and subjected to sulfonation reaction at 80° C. for 6 hours. Thereafter, the membrane was washed with water to leave sulfonic acid groups behind.

The electrolyte membrane of the present invention is suitable for use as an electrolyte membrane in fuel cells that have potential use in computers, mobile devices typified by personal computers, household cogeneration systems, automobiles, etc.

What is claimed is:

1. A polymer electrolyte membrane for fuel cells that is produced by subjecting a polymer film substrate to multi-graft polymerization with monomers comprising at least one monofunctional vinyl monomer of the following group A as combined with at least one polyfunctional vinyl monomer of the following group B, crosslinking the film substrate containing the grafted molecular chains by irradiation, and then introducing sulfonic acid groups into the grafted molecular chains or the aromatic rings in the grafted molecular chains, the monofunctional vinyl monomer of group A being a monomer selected from the group consisting of styrene; alkylstyrenes such as methylstyrenes (e.g., α-methylstyrene and vinyltoluene), ethylstyrenes, dimethylstyrenes, trimethylstyrenes, pentamethylstyrenes, diethylstyrenes, isopropylstyrenes, and butylstyrenes (e.g., 3-tertbutylstyrene and 4-tert-butylstyrene); halogenated styrenes such as chlorostyrenes, dichlorostyrenes, trichlorostyrenes, bromostyrenes (e.g., 2-bromostyrene, 3-bromostyrene and 4-bromostyrene), and fluorostyrenes (e.g., 2-fluorostyrene, 3-fluorostyrene and 4-fluorostyrene); alkoxystyrenes such as methoxystyrenes, methoxymethylstyrenes, dimethoxystyrenes, ethoxystyrenes, and vinylphenyl allyl ethers; hydroxystyrene derivatives such as hydroxystyrenes, methoxyhydroxystyrenes, acetoxystyrenes, and vinylbenzyl alkyl ethers; vinylbenzoic acids; carboxystyrene derivatives such as formylstyrenes; nitrostyrene derivatives such as nitrostyrenes; aminostyrene derivatives such as aminostyrenes and dimethlaminostyrenes; vinyl benzylsulfonic acids; and ion-containing styrene derivatives such as styrene sulfonyl fluorides; and the polyfunctional vinyl monomer of group B being a crosslinking agent selected from the group consisting of bis(vinylphenyl)ethane, divinylbenzene, 2,4,6-triallyloxy-1,3,5-triazine (triallylcyanurate), triallyl-1,2,4-benzenetricarboxylate (triallyltrimellitate), diallyl ether, triallyl-1,3,5-triazine-2,4,6-(1H,3H,5H)-trione, 2,3-diphenylbutadiene, 1,4-diphenyl-1,3-butadiene, 1,4-divinyloctafluorobutane, bis(vinylphenyl)methane, divinylacetylene, divinyl sulfide, divinyl sulfone, divinyl ether, divinyl sulfoxide, isoprene, 1,5-hexadiene, butadiene, and 1,4-divinyl-2,3,5,6-tetrachlorobenzene.

2. The polymer electrolyte membrane for fuel cells according to claim 1, wherein the polymer film substrate comprises an olefinic polymer or a fluorine-containing polymer.

3. The polymer electrolyte membrane for fuel cells according to claim 1, wherein the graft polymer obtained has a degree of grafting at 6-120% and an ion-exchange capacity of 0.3-4.0 meq/g.

4. The polymer electrolyte membrane for fuel cells according to claim 2, wherein the graft polymer obtained has a degree of grafting at 6-120% and an ion-exchange capacity of 0.3-4.0 meq/g.

* * * * *

UNITED STATES PATENT AND TRADEMARK OFFICE
CERTIFICATE OF CORRECTION

| | | |
|---|---|---|
| PATENT NO. | : 7,803,846 B2 | Page 1 of 1 |
| APPLICATION NO. | : 11/214045 | |
| DATED | : September 28, 2010 | |
| INVENTOR(S) | : Masaru Yoshida et al. | |

It is certified that error appears in the above-identified patent and that said Letters Patent is hereby corrected as shown below:

On the title page, item [75]: (Inventors), line 5, delete "Ibaraski" and insert -- Ibaraki --, therefor.

Signed and Sealed this
Third Day of May, 2011

David J. Kappos
*Director of the United States Patent and Trademark Office*